July 20, 1965
M. J. McINTYRE
3,195,695
PORTABLE LOGGING TOWER
Filed Sept. 28, 1961
3 Sheets-Sheet 2
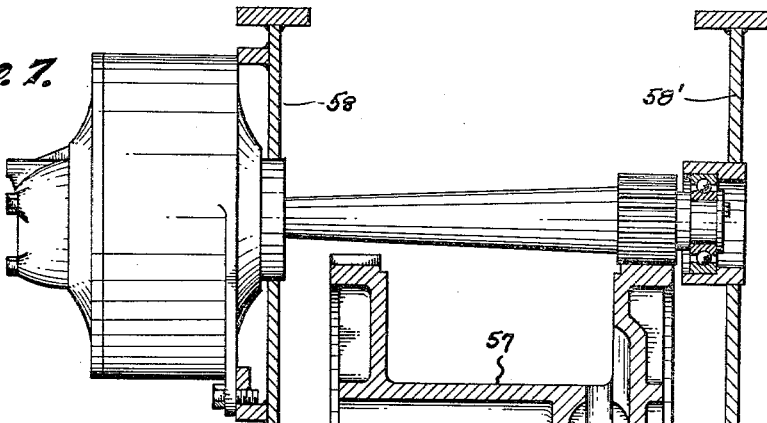
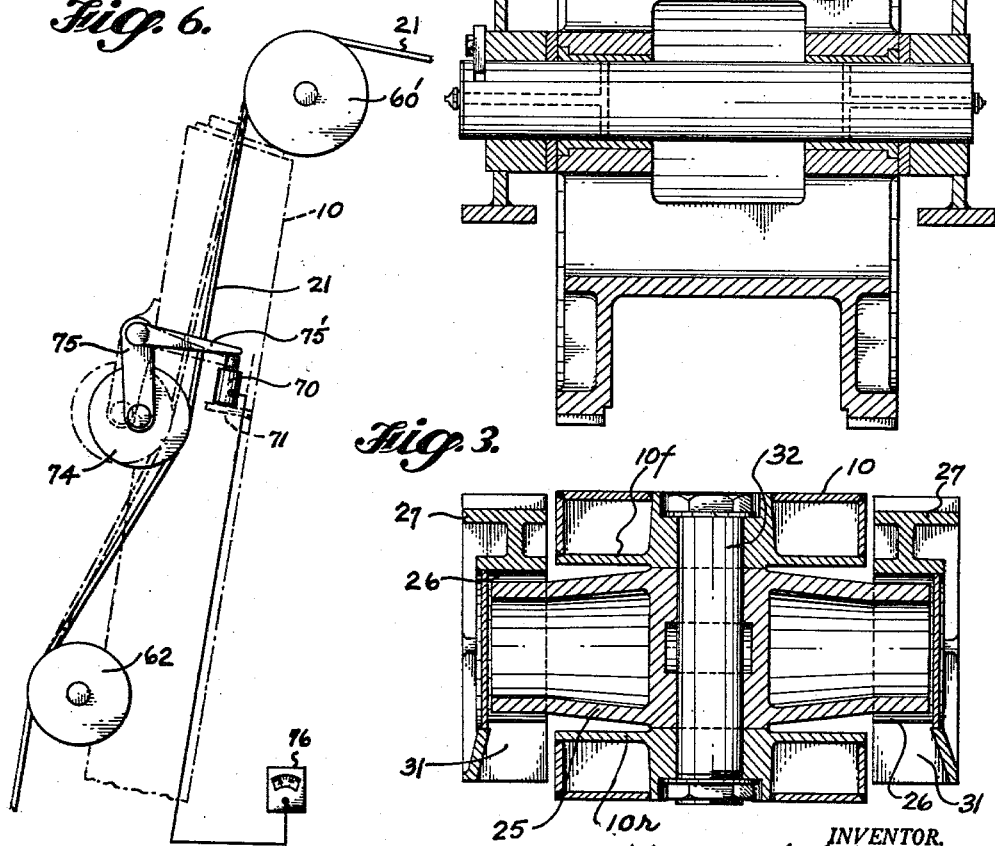
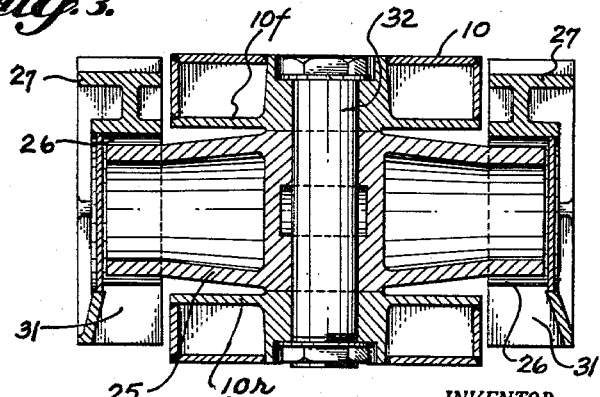
INVENTOR.
MAURICE J. McINTYRE
BY
Robinson & Berry
ATTORNEYS

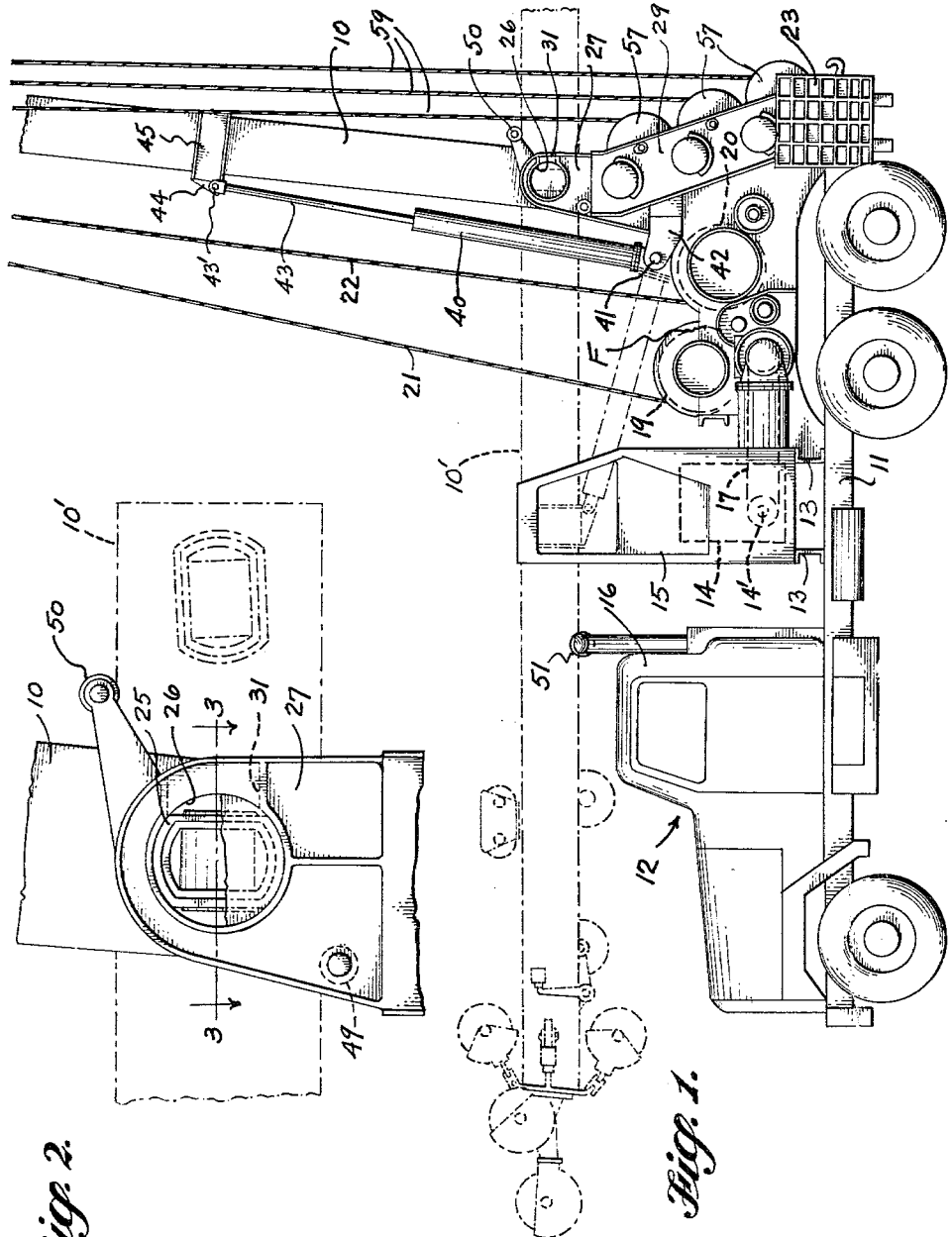
INVENTOR.
MAURICE J. McINTYRE

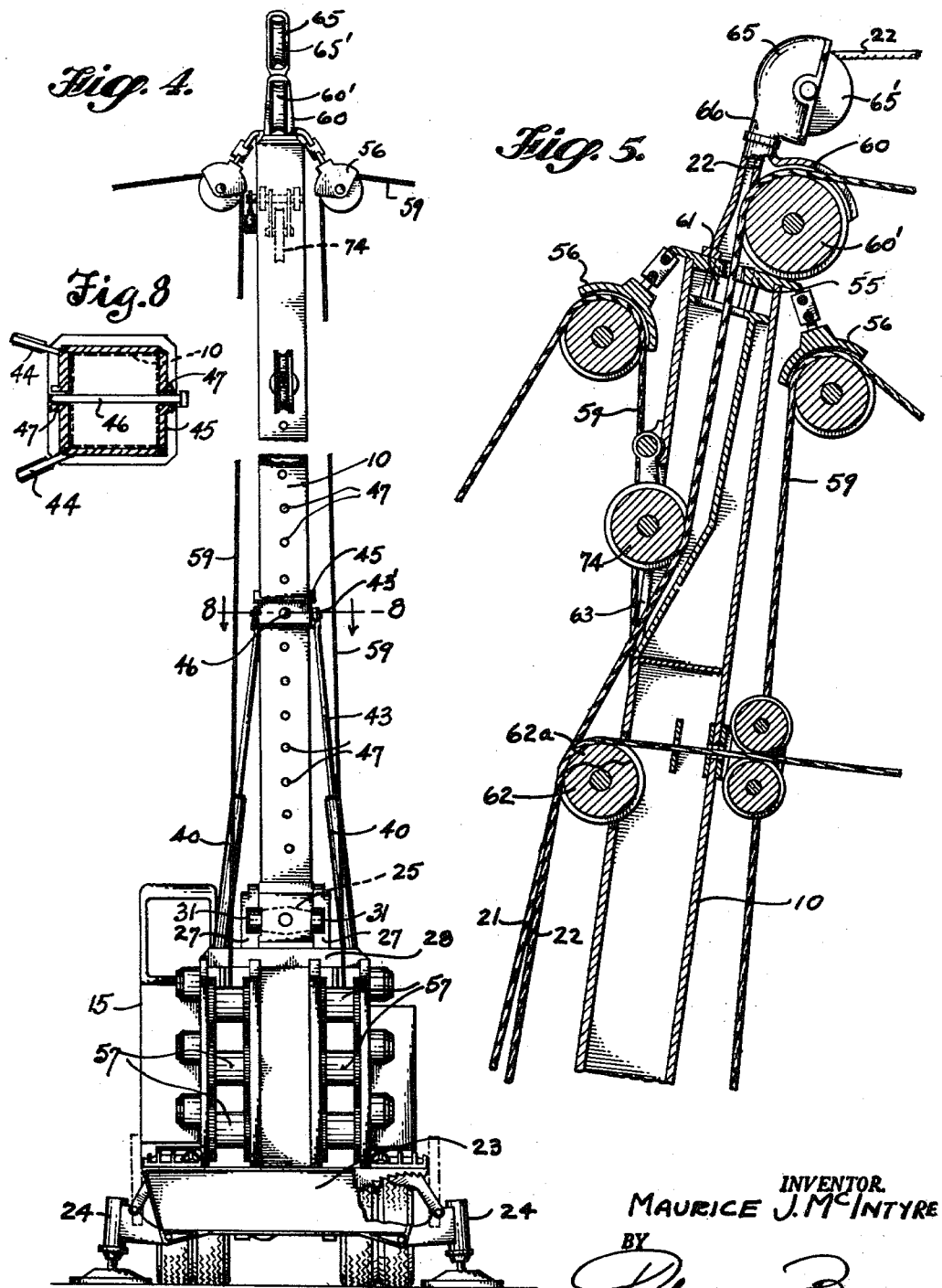

3,195,695
PORTABLE LOGGING TOWER
Maurice J. McIntyre, Sedro Woolley, Wash., assignor to The Humboldt Company, Seattle, Wash., a corporation of Washington
Filed Sept. 28, 1961, Ser. No. 141,465
3 Claims. (Cl. 189—11)

This invention relates to what are generally designated in the logging industry as portable logging towers. More particularly, it pertains to the provision of a tower or what may be referred to as a mast or spar, especially designated for use in present day cable logging operations and which tower, together with all necessary cable winding drums for tower guying and the intended cable logging operations, engine, power transmission mechanisms and controls are operatively assembled on a unitized frame structure that is readily applicable to the bed of a typical heavy duty truck for its intended use without necessitating and redesigning or material changes in the truck bed or frame structure.

It is the principal object of the present invention to provide a tower having a pivotal mounting means at its lower end that permits the ready adjustment of the tower between its substantially vertical position of normal use and a position of horizontal support on the unitized frame structure as mounted on the truck for travel and which pivotal mounting further provides for the endwise shifting movement of the mast on its supports when horizontally disposed to whatever extent is required for obtaining the proper or a better balance and positioning of the tower on the truck for its conveyance from location to location.

It is another object of this invention to provide better operational support of the erected tower by the provision and use of special outrigger jacks in direct association with the unitized frame structure whereby the weight of the mast and its rigging in logging operations will be withheld from the chassis and wheel structure of the carrier vehicle.

Another object of this invention resides in the provision and use of paired power cylinders on the unitized frame structure for the adjustment of the tower between its lowered and erected positions and for effecting its longitudinal shifting for balancing when in its horizontal position of support on the carrier vehicle.

Yet another object of the invention is to provide a pivot member at the lower end of the tower and bearing means for containing the pivot member that are so designed as to permit the latter to be unseated and slid from the bearing means for the endwise shifting of the tower to obtain its desired balance on the carrier vehicle during travel.

Still another object of this invention resides in the provision of means in the tower and operable under control of the log loading main line for indicating the tension to which said main line is subjected during its use.

Still another object of the invention is to employ in connection with each of the guyline winding drums, gearing for obtaining different driving speeds for outward and reverse winding of these cable drums.

Further objects and advatnages of the invention reside in the details of construction and mode of use of the tower and its raising and lowering cylinders.

In accomplishing the above mentioned and other objects of the invention, I have provided the improved details of construction, the preferred forms of which are illustrated in the accompanying drawings wherein:

FIG. 1 is a side view of a heavy duty truck on which the unitized frame structure of this invention, as equipped with tower and rigging, is mounted; the position of the tower when lowered for transportation being shown in dash lines.

FIG. 2 is an enlarged side view of the tower mounting pivot and its supporting means as seen in FIG. 1.

FIG. 3 is a horizontal section taken on line 3—3 in FIG. 2.

FIG. 4 is a rear end elevation of the truck and tower as mounted thereon showing also the outrigger supports for the tower as associated with the unitized frame structure.

FIG. 5 is an enlarged, side view of the upper end rigging of the mast as seen in FIG. 1 seen partly in vertical section.

FIG. 6 is a schematic showing of the tension indicating means as used in the tower conjunction with the main line cable.

FIG. 7 is a sectional detail of the driving means of a guyline drum, providing for different speeds for paying out and winding in.

FIG. 8 is a horizontal cross-section on line 8—8 in FIG. 4.

Referring more in detail to the drawings:

In FIGS. 1 and 4, I have shown the present tower 10, as functionally mounted on a unitary frame structure F which in turn is mounted on the horizontal bed 11 of a typical heavy duty truck herein designated in its entirety by reference numeral 12. In dash lines at 10′, the tower 10 has been shown as adjusted to that horizontally disposed, down position of support on the unitized frame structure for its transportation between places of use.

The base of the unitary frame structure F comprises at its forward end, two tranvsersely disposed channel beams 13—13, spaced in the longitudinal direction of the truck bed and mounting an engine 14 and engineer's cab 15 thereon in a position slightly rearward of the truck cab 16. It is indicated in FIG. 1 that the drive shaft 14′ of the engine is operatively connected by a chain belt 17 with the power transmission mechanism 18 through which driving connections are made with cable drums 19 and 20 as used for logging; these drums having the main line cable 21 and haulback cable 22, respectively, wound thereon and extended upwardly and over fairleaders mounted at the top end of the tower or mast 10 as presently described.

At its rear end the unitary frame structure F includes a horizontally and transversely disposed, rigid frame or housing structure 23 with opposite end portions extending equally to opposite sides of the vehicle bed and there equipped with outrigger jacks of the type shown at 24—24 in FIG. 4; these outriggers being of the same general construction and mode of use as those disclosed in U.S. Patent No. 2,855,111; their purpose being to sustain the weight of the tower and its rigging directly thereon during a logging operation and stabilizing the machine as the tower is raised.

The tower 10 as presently employed, is approximately fifty feet long. It is fabricated from metal plates and as shown is of square and uniform tubular cross-section from end to end, as illustrated in FIG. 3. At its lower end, it is equipped for its support and pivotal raising and lowering movements with a transversely directed pivot member 25 which, at its opposite ends, is pivotally seated in circular openings 26 formed in laterally spaced vertical frames 27—27 fixed on the top cross-beam 28 of a tower mounting frame structure 29 which is incorporated in the transverse rear end portion of the unitary frame structure F as applied to the truck bed 11; the two laterally spaced frames 27—27 being symmetrically spaced at opposite sides of the central longitudinal plane of the truck.

A feature of this invention resides in the fact that the openings 26—26 provided in the frames 27—27 to receive the ends of the pivot member 25 are circular and in transverse horizontal alignment and each opening has a passage 31 leading rearwardly therefrom and from the frames; these passages being lesser in vertical height than the diameter of the circular seats, as has been shown in FIG. 2. The pivot member 25 is tubular, as shown in FIG. 3, and its opposite trunnion-like end portions as extended laterally from the tower sides have opposite face portions removed so as to decrease their normal horizontal dimensions to the extent required for the passage of these trunnion end portions through the passages 31 but only when the tower is rotated to its horizontal position. It is to be understood that while the tower is in the upright position, the ends of the pivot member are as seen in FIG. 2 and cannot be displaced from their circular seats through the passages 31.

It is further to be understood that the pivot pin 25 is of the tubular formation seen in FIG. 3 and it extends transversely through the tower and freely through openings in its opposite sidewalls. Medially of its ends the pin 25 mounts a pivot pin 32 therein at a 90° angle relative to the axis of the pivot pin 25. The ends of this latter pin 32, are mounted in bearings formed in the front and rear wall plates 10f and 10r of the mast structure as best shown in FIG. 3. Thus, the tower is supported for limited universal pivotal action.

The means provided for raising and lowering the tower 10 comprises a pair of elongated hydraulic cylinders 40—40, shown in FIGS. 1 and 4 to be disposed slightly forwardly of the lower end portion of the tower, equally spaced at opposite sides of the medial vertical plane of the truck and the unitized frame structure. The lower ends of these cylinders are pivotally secured as at 41, to brackets 42 fixed to the unitized frame structure and their upwardly directed piston rods 43 are pivotally attached at their upper ends, as at 43' in FIG. 1 to ears 44 extended forwardly from a metal sleeve or collar 45 that is slidably fitted about the tower and is normally secured against movement thereon by a pin 46 applied therethrough as in FIG. 8; this being selectively applicable to any of a succession of holes 47 formed in spaced relationship through the tower as shown in FIG. 4.

For the lowering of the tower from its FIG. 1 position the usual procedure is first to wind in the main haul-back cable and guyline cables on their respective drums. Then the mast 10 is swung forwardly and downwardly by applying power to the upper ends of the hydraulic cylinders 40—40 to a position of rest on an A-frame support 48 that is applied to the truck frame 11 at a location just back of the truck cab as shown in FIG. 1.

It is to be understood that with the lowering of the tower 10 to its horizontal position, its pivot pin 25 turns axially and thus positions its unround opposite end trunnion portions properly for rearward sliding outwardly through the passages 31 that lead from the circular openings 26 of frames 27.

Then, by pulling the locking pin 46 from the collar 45, the latter may be shoved forwardly along the tower by the extending of the piston rods of the hydraulic cylinders 40, then by again applying the pin 46 through the collar and tower, retracting the piston rods will cause the tower to be shifted rearwardly on its supports and this may be repeated as required for obtaining desired balance. When so lowered for travel, the tower is held at its rearward portion by and between transverse rollers 49 and 50 that are extended between and rotatably supported by the laterally spaced frames 27—27 above and below the tower as shown in FIGS. 1 and 2 and toward its forward end portion, it rests on a roller 51 carried at the apex of the A-frame 48.

At its top end, the tower is equipped with a flange plate 55 to the opposite edges of which a plurality of guyline pulley blocks 56 are attached. Three guyline drums 57 are mounted horizontally between vertical, laterally spaced frame members 58—58' that are incorporated in the rear end portion of the unitized frame structure F at its opposite sides as shown in FIG. 4. Each of these drums 57 has a guyline cable 59 extended upwardly therefrom, through the corresponding sheaves block 56 and thence outwardly to a suitable anchoring means (not shown). These guyline drums may be selectively driven as may be required for paying the cables in or out therefrom as required for proper guying of the tower. The driving means for these drums shown in FIG. 7 will presently be more fully described.

Above the flange plate 55 to which the guyline blocks 56 are attached is a fairleader block 60 mounted by a vertical, tubular stem 60s that has a swivel mounting in a bearing 61 secured in the top end of the tower. The main line 21, which extends upwardly from its cable winding drum 19 passes over a guiding sheave wheel 62 mounted on the side of the tower near its top end as in FIG. 6, thence passes upwardly and inwardly through a wall slot 63 in the tower thence through the tubular stem 60s and out and over a sheave wheel 60'.

Swivelly mounted on the fairleader block 60 is another fairleader block 65 that likewise has a tubular mounting stem 66. This is axially aligned with the tubular stem of block 60. The block 65 mounts a sheave wheel 65'. The haul-back line leads upwardly from its winding drum over a guiding sheave wheel 62a mounted on the side of the mast adjacent wheel 62, thence inwardly through the slot 63 and upwardly through the aligned tubular stems 60 and 66 and over sheave 65'. By the above means, the main line and haul-back cables are passed to their respective swivel blocks without interference with or by the guying cables or their blocks.

In FIG. 6, I have schematically illustrated the use of a "load cell" for indication of tension on the main line. The load cell is designated by numeral 70 and is shown to be operatively supported on a fixed support or wall 71 in the tower, at a location between the guide sheave 62 and fair leader block stem. A wheel 74 mounted by one arm of a pivotally mounted bell crank lever 75 is held thereby in rolling contact with the main line cable for its angular deflection. The opposite arm 75' of the bell crank acts on the cell to change and control its functioning in accordance with change in deflection of the cable by wheel 74. The cell 70 has the required electrical connection leading therefrom to a remotely located indicator, to visually indicate the tension to which the cable is subjected at any time. The indicator is designated by numeral 76 in FIG. 6 and would be located, preferably, in the operator's cab 15.

By this means, the pull or weight sustained by the main line cable 21 will cause change in the extent of deflection of the cable and will cause change in the readings of the load cell indicator accordingly. The indicator is placed in view of the machine operator and enables him to avoid any overloading of the line.

It is also a feature of the present invention that each of the guyline winding drums is driven by a shaft operating through a "gearmatic" mechanism whereby the guyline cables can be paid out at a fast speed and wound in at a substantially slower speed.

In summarizing the advantages residing in this particular tower arrangement, it is well to mention the following:

(a) The use of a unitized frame structure mounting the tower and all the equipment required for its use, and which frame is so equipped as to be readily applicable to present day trucks without requiring their alteration.

(b) The tower is provided with a pivotal support at its lower end on which it is adjustable between raised and lowered positions under the control of a pair of hydraulic jacks 40—40 with piston rods attached thereto at points well above the pivot pin 25 and set in convergence to give lateral support while raising the tower. The cylinders are controlled independently so as to steer the tower as it is being raised.

(c) The pivot member 25 for the tower may be slid from its supporting seats for the endwise shifting of the mast to obtain better balance for transportation, but only when the tower is in a lowered, horizontal position.

(d) The hydraulic jacks 40—40 are operable for effecting longitudinal shifting of the tower.

(e) The tower is equipped with means for indicating main line tension.

(f) The guyline drums are equipped with two speed driving gearing.

What I claim as new is:

1. A tower structure comprising a base equipped with a cylindrical tower mounting bearing, a tower having its lower end supported by said mounting bearing, said mounting bearing being formed with a horizontal passage leading to one edge thereof, a first horizontal pivot pin secured to the lower end of the tower and adapted to be pivotally contained in said bearing, said passage being of lesser vertical height than the diameter of said bearing from which it leads and said first pin being of cylindrical form with flattened side surfaces in one direction, said flattened side surfaces being in planes parallel with the longitudinal axis of said tower whereby said first pin will only pass through said passage when the tower is in a horizontal position, a second pin pivotally mounting said first pin medially of the ends of said first pin for limited rocking movement by said second pin, and said second pin being so fixed at its opposite ends in the tower as to extend horizontally when the mast is in an upright position of use, and swings to a vertical position with the swinging of the tower to lowered, horizontal position, thus to axially rotate the said first pin for the movement of its diametrically reduced portion through said bearing passages.

2. A tower structure according to claim 1 wherein said bearing includes laterally spaced parts between which said tower is positioned and said first pin extends through and projects beyond the opposite sides of said tower.

3. A tower structure according to claim 1 wherein said base is mounted on a mobile vehicle and wherein said vehicle is equipped at its forward end with an upwardly extending frame adapted for the sliding support of the upper end portion of the tower thereon when lowered to horizontal position, and wherein said bearing is equipped with means for the sliding support of the tower thereon in its longtudinal adjustment.

References Cited by the Examiner

UNITED STATES PATENTS

| | | | |
|---|---|---|---|
| 1,779,480 | 10/30 | Loomis | 254—173 |
| 2,371,953 | 3/45 | Crake | 254—173 |
| 2,694,474 | 11/54 | Meany | 189—11 |
| 2,711,803 | 6/55 | Hurst | 254—139 X |
| 2,883,068 | 4/59 | McIntyre | 212—70 |
| 2,922,501 | 1/60 | Wilson | 189—11 |
| 2,963,123 | 12/60 | Woolslayer et al. | 189—11 |
| 2,985,429 | 5/61 | LeTourneau | 254—139 |
| 3,043,398 | 7/62 | Bakula | 182—68 X |

FOREIGN PATENTS 316,694   12/56   Switzerland.

RICHARD W. COOKE, JR., *Primary Examiner.*

JOSEPH P. STRIZAK, *Examiner.*